United States Patent
Ali

(10) Patent No.: US 8,606,037 B2
(45) Date of Patent: Dec. 10, 2013

(54) TECHNIQUES TO IMPROVE CONTRAST ENHANCEMENT

(75) Inventor: Walid S. Ali, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 2033 days.

(21) Appl. No.: 11/211,363

(22) Filed: Aug. 24, 2005

(65) Prior Publication Data
US 2007/0053606 A1    Mar. 8, 2007

(51) Int. Cl.
*G06K 9/40*    (2006.01)

(52) U.S. Cl.
USPC .......................................... 382/274

(58) Field of Classification Search
USPC ............ 345/617; 348/28, 234, 235, 236, 237, 348/238, 365, 603, 678, E5.119, 112; 358/520; 382/274
See application file for complete search history.

(56) References Cited

U.S. PATENT DOCUMENTS

| | | | | |
|---|---|---|---|---|
| 4,999,711 A | * | 3/1991 | Paulin | 348/672 |
| 5,546,134 A | * | 8/1996 | Lee | 348/673 |
| 6,873,742 B2 | * | 3/2005 | Schu | 382/274 |
| 2001/0052945 A1 | * | 12/2001 | Stessen | 348/672 |
| 2003/0025838 A1 | | 2/2003 | Kim | |
| 2004/0207759 A1 | | 10/2004 | Li et al. | |
| 2005/0057485 A1 | * | 3/2005 | Diefenbaugh | 345/102 |

FOREIGN PATENT DOCUMENTS

| | | |
|---|---|---|
| EP | 0723364 A2 | 7/1996 |
| WO | 2007/024415 A1 | 3/2007 |

OTHER PUBLICATIONS

Office Action received for German Patent Application No. 11 2006 002 124.9, mailed Jul. 9, 2013, 8 pages including 3 pages English translation.*
NVIDIA, "ForceWare Graphics Driver User's Guide", http://download.nvidia.com/windows/78.01/78.1_forceWare_Release_75_Display_Property_User_Guide.pdf>, (Jun. 2005),100-106.
William, K. P., "Image Enchancement", Digital Image Processing (Third Edition), Chapter 10 Image Enhancement, Interscience,(Feb. 19, 2002),243-253.

* cited by examiner

*Primary Examiner* — Gregory F Cunningham
(74) *Attorney, Agent, or Firm* — Kacvinsky Daisak PLLC

(57) ABSTRACT

An apparatus, system, method, and article for enhancing video sharpness are described. The apparatus may include a media processing node to receive an input image having a first level of contrast, and create an output image having a second level of contrast using a scaled luminance transfer function. Other embodiments are described and claimed.

20 Claims, 6 Drawing Sheets

TECHNIQUES TO IMPROVE CONTRAST ENHANCEMENT

BACKGROUND

Sharpness is a perceptual feature, which is determined by the human visual system. Techniques to improve contrast between lighter regions and darker regions within an image may improve the sharpness of an image. Such techniques, however, may require complex hardware or produce irritating artifacts that reduces the overall impression of sharpness improvement.

DETAILED DESCRIPTION

Figure 1:
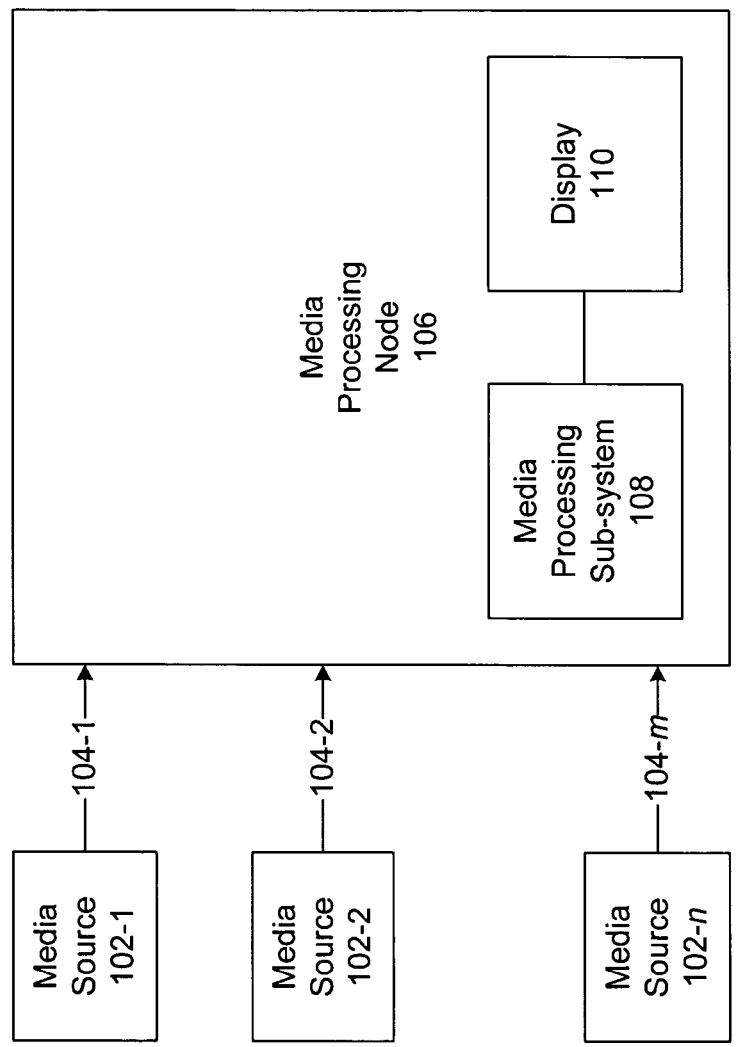
FIG. 1 illustrates one embodiment of a media processing system.

FIG. 1 illustrates one embodiment of a system. FIG. 1 illustrates a block diagram of a system 100. In one embodiment, for example, system 100 may comprise a media processing system having multiple nodes. A node may comprise any physical or logical entity for processing and/or communicating information in the system 100 and may be implemented as hardware, software, or any combination thereof, as desired for a given set of design parameters or performance constraints. Although FIG. 1 is shown with a limited number of nodes in a certain topology, it may be appreciated that system 100 may include more or less nodes in any type of topology as desired for a given implementation. The embodiments are not limited in this context.

In various embodiments, a node may comprise, or be implemented as, a computer system, a computer sub-system, a computer, an appliance, a workstation, a terminal, a server, a personal computer (PC), a laptop, an ultra-laptop, a hand-held computer, a personal digital assistant (PDA), a set top box (STB), a telephone, a mobile telephone, a cellular telephone, a handset, a wireless access point, a base station (BS), a subscriber station (SS), a mobile subscriber center (MSC), a radio network controller (RNC), a microprocessor, an integrated circuit such as an application specific integrated circuit (ASIC), a programmable logic device (PLD), a processor such as general purpose processor, a digital signal processor (DSP) and/or a network processor, an interface, an input/output (I/O) device (e.g., keyboard, mouse, display, printer), a router, a hub, a gateway, a bridge, a switch, a circuit, a logic gate, a register, a semiconductor device, a chip, a transistor, or any other device, machine, tool, equipment, component, or combination thereof. The embodiments are not limited in this context.

In various embodiments, a node may comprise, or be implemented as, software, a software module, an application, a program, a subroutine, an instruction set, computing code, words, values, symbols or combination thereof. A node may be implemented according to a predefined computer language, manner or syntax, for instructing a processor to perform a certain function. Examples of a computer language may include C, C++, Java, BASIC, Perl, Matlab, Pascal, Visual BASIC, assembly language, machine code, microcode for a processor, and so forth. The embodiments are not limited in this context.

In various embodiments, the communications system 100 may communicate, manage, or process information in accordance with one or more protocols. A protocol may comprise a set of predefined rules or instructions for managing communication among nodes. A protocol may be defined by one or more standards as promulgated by a standards organization, such as, the International Telecommunications Union (ITU), the International Organization for Standardization (ISO), the International Electrotechnical Commission (IEC), the Institute of Electrical and Electronics Engineers (IEEE), the Internet Engineering Task Force (IETF), the Motion Picture Experts Group (MPEG), and so forth. For example, the described embodiments may be arranged to operate in accordance with standards for media processing, such as the National Television System Committee (NTSC) standard, the Phase Alteration by Line (PAL) standard, the MPEG-1 standard, the MPEG-2 standard, the MPEG-4 standard, the Digital Video Broadcasting Terrestrial (DVB-T) broadcasting standard, the ITU/IEC H.263 standard, Video Coding for Low Bitrate Communication, ITU-T Recommendation H.263v3, published November 2000 and/or the ITU/IEC H.264 standard, Video Coding for Very Low Bit Rate Communication, ITU-T Recommendation H.264, published May 2003, and so forth. The embodiments are not limited in this context.

In various embodiments, the nodes of system 100 may be arranged to communicate, manage or process different types of information, such as media information and control information. Examples of media information may generally include any data representing content meant for a user, such as voice information, video information, audio information, image information, textual information, numerical information, alphanumeric symbols, graphics, and so forth. Control information may refer to any data representing commands, instructions or control words meant for an automated system. For example, control information may be used to route media information through a system, to establish a connection between devices, instruct a node to process the media information in a predetermined manner, and so forth. The embodiments are not limited in this context.

In various embodiments, system 100 may be implemented as a wired communication system, a wireless communication system, or a combination of both. Although system 100 may be illustrated using a particular communications media by way of example, it may be appreciated that the principles and techniques discussed herein may be implemented using any type of communication media and accompanying technology. The embodiments are not limited in this context.

When implemented as a wired system, for example, system 100 may include one or more nodes arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The wired communications media may be connected to a node using an input/output (I/O) adapter. The I/O adapter may be arranged to operate with any suitable technique for controlling information signals between nodes using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless system, for example, system 100 may include one or more wireless nodes arranged to communicate information over one or more types of wireless communication media. An example of wireless communication media may include portions of a wireless spectrum, such as the RF spectrum in general, and the ultra-high frequency (UHF) spectrum in particular. The wireless nodes may include components and interfaces suitable for communicating information signals over the designated wireless spectrum, such as one or more antennas, wireless transmitters/receivers ("transceivers"), amplifiers, filters, control logic, antennas, and so forth. The embodiments are not limited in this context.

In various embodiments, system 100 may comprise a media processing system having one or more media source nodes 102-1n. Media source nodes 102-1n may comprise any media source capable of sourcing or delivering media information and/or control information to media processing node 106. More particularly, media source nodes 102-1n may comprise any media source capable of sourcing or delivering digital audio and/or video (AV) signals to media processing node 106. Examples of media source nodes 102-1n may include any hardware or software element capable of storing and/or delivering media information, such as a Digital Versatile Disk (DVD) device, a Video Home System (VHS) device, a digital VHS device, a personal video recorder, a computer, a gaming console, a Compact Disc (CD) player, computer-readable or machine-readable memory, a digital camera, camcorder, video surveillance system, teleconferencing system, telephone system, medical and measuring instruments, scanner system, copier system, and so forth. Other examples of media source nodes 102-1n may include media distribution systems to provide broadcast or streaming analog or digital AV signals to media processing node 106. Examples of media distribution systems may include, for example, Over The Air (OTA) broadcast systems, terrestrial cable systems (CATV), satellite broadcast systems, and so forth. It is worthy to note that media source nodes 102-1n may be internal or external to media processing node 106, depending upon a given implementation. The embodiments are not limited in this context.

In various embodiments, the incoming video signals received from media source nodes 102-1n may have a native format, sometimes referred to as a visual resolution format. Examples of a visual resolution format include a digital television (DTV) format, high definition television (HDTV), progressive format, computer display formats, and so forth. For example, the media information may be encoded with a vertical resolution format ranging between 480 visible lines per frame to 1080 visible lines per frame, and a horizontal resolution format ranging between 640 visible pixels per line to 1920 visible pixels per line. In one embodiment, for example, the media information may be encoded in an HDTV video signal having a visual resolution format of 720 progressive (720p), which refers to 720 vertical pixels and 1280 horizontal pixels (720×1280). In another example, the media information may have a visual resolution format corresponding to various computer display formats, such as a video graphics array (VGA) format resolution (640×480), an extended graphics array (XGA) format resolution (1024×768), a super XGA (SXGA) format resolution (1280×1024), an ultra XGA (UXGA) format resolution (1600×1200), and so forth. The embodiments are not limited in this context.

In various embodiments, media processing system 100 may comprise a media processing node 106 to connect to media source nodes 102-1n over one or more communications media 104-1-m. Media processing node 106 may comprise any node as previously described that is arranged to process media information received from media source nodes 102-1n. In various embodiments, media processing node 106 may comprise, or be implemented as, one or more media processing devices having a processing system, a processing sub-system, a processor, a computer, a device, an encoder, a decoder, a coder/decoder (CODEC), a filtering device (e.g., graphic scaling device, deblocking filtering device), a transformation device, an entertainment system, a display, or any other processing architecture. The embodiments are not limited in this context.

In various embodiments, media processing node 106 may include a media processing sub-system 108. Media processing sub-system 108 may comprise a processor, memory, and application hardware and/or software arranged to process media information received from media source nodes 102-1n. For example, media processing sub-system 108 may be arranged to vary a contrast level of an image or picture and perform other media processing operations as described in more detail below. Media processing sub-system 108 may output the processed media information to a display 110. The embodiments are not limited in this context.

In various embodiments, media processing node 106 may include a display 110. Display 110 may be any display capable of displaying media information received from media source nodes 102-1n. Display 110 may display the media information at a given format resolution. For example, display 110 may display the media information on a display having a VGA format resolution, XGA format resolution, SXGA format resolution, UXGA format resolution, and so forth. The type of displays and format resolutions may vary in accordance with a given set of design or performance constraints, and the embodiments are not limited in this context.

In general operation, media processing node 106 may receive media information from one or more of media source nodes 102-1n. For example, media processing node 106 may receive media information from a media source node 102-1 implemented as a DVD player integrated with media processing node 106. Media processing sub-system 108 may retrieve the media information from the DVD player, convert the media information from the visual resolution format to the display resolution format of display 110, and reproduce the media information using display 110.

In various embodiments, media processing node 106 may be arranged to receive an input image from one or more of media source nodes 102-1n. The input image may comprise any data or media information derived from or associated with one or more video images. In one embodiment, for example, the input image may comprise a picture in a video sequence comprising signals (e.g., Y, U, and V) sampled in both the horizontal and vertical directions. In various embodiments, the input image may comprise one or more of image data, video data, video sequences, groups of pictures, pictures, images, regions, objects, frames, slices, macroblocks, blocks, pixels, signals, and so forth. The values assigned to pixels may comprise real numbers and/or integer numbers.

In various embodiments, media processing node 106 may be arranged to perform sharpness enhancement on the received input image. The luminance of a picture in a video sequence may describe the amount of brightness of one or more pixels of the picture. When combined with the overall luminance values of the remaining pixels in the picture, this will give an overall impression of the variation between lighter portions (regions) and darker portions (regions) of the picture. This may determine a perceived level of contrast in the video sequence. Widening the luminance difference between lighter and darker portions may improve perception of the picture by the human visual system, which in turn may result in a perceived increase in the depth and sharpness of the picture.

Conventional techniques to increase the luminance difference between lighter and darker regions in order to vary the contrast level of a picture, however, may be undesirable for a number of reasons. For example, one technique performs contrast enhancement by building and modifying a histogram using a number of joined linear segments. Such techniques rely upon detecting control points using computationally expensive analysis of the luminance histogram to produce a number of joint linear segments to approximate a transfer function between the luminance at the input and output. These techniques, however, are relatively complex and expensive to implement. In addition, the joints points where two linear segments connect may have a relatively strong discontinuity that results in an abrupt and severe transition. This may result in the creation of an undesirable artificial shadow, contours, bands, artifacts, and so forth.

Some embodiments attempt to solve these and other problems. In one embodiment, for example, media processing sub-system 108 of media processing node 106 may be arranged to perform contrast or sharpness enhancement on the received input image. Media processing sub-system 108 may utilize one or more pre-defined or predetermined mathematical functions to change the luminance of an input image in order to achieve a perception of stronger contrast enhancement. System 100 in general, and media processing sub-system 108 in particular, may be described in more detail with reference to FIG. 2.

Figure 2:
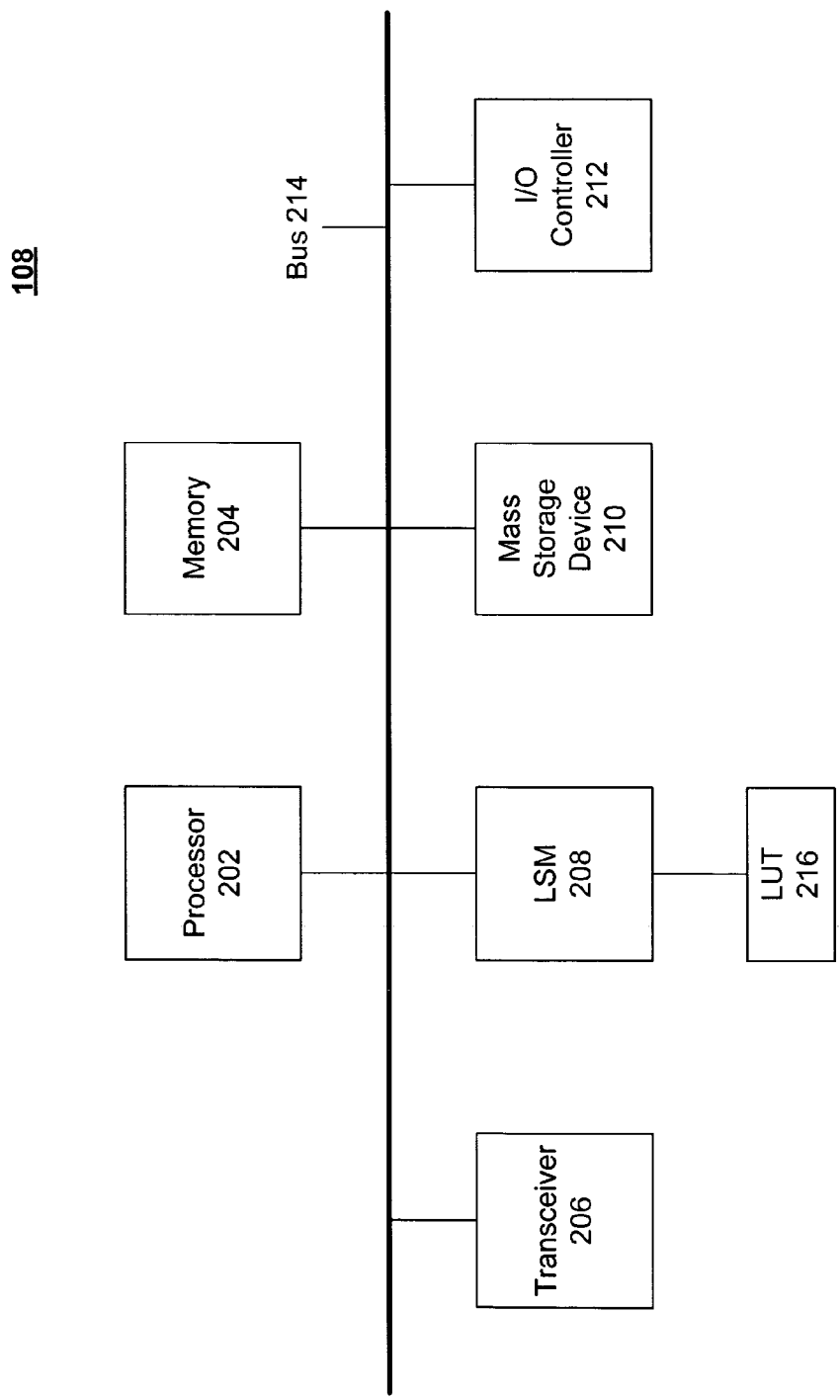
FIG. 2 illustrates one embodiment of a media processing sub-system.

FIG. 2 illustrates one embodiment of a media processing sub-system 108. FIG. 2 illustrates a block diagram of a media processing sub-system 108 suitable for use with media processing node 106 as described with reference to FIG. 1. The embodiments are not limited, however, to the example given in FIG. 2.

As shown in FIG. 2, media processing sub-system 108 may comprise multiple elements. One or more elements may be implemented using one or more circuits, components, registers, processors, software subroutines, modules, or any combination thereof, as desired for a given set of design or performance constraints. Although FIG. 2 shows a limited number of elements in a certain topology by way of example, it can be appreciated that more or less elements in any suitable topology may be used in media processing sub-system 108 as desired for a given implementation. The embodiments are not limited in this context.

In various embodiments, media processing sub-system 108 may include a processor 202. Processor 202 may be implemented using any processor or logic device, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, processor 202 may be implemented as a general purpose processor, such as a processor made by Intel® Corporation, Santa Clara, Calif. Processor 202 may also be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), and so forth. The embodiments are not limited in this context.

In one embodiment, media processing sub-system 108 may include a memory 204 to couple to processor 202. Memory 204 may be coupled to processor 202 via communications bus 214, or by a dedicated communications bus between processor 202 and memory 204, as desired for a given implementation. Memory 204 may be implemented using any machine-readable or computer-readable media capable of storing data, including both volatile and non-volatile memory. For example, memory 204 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 204 may be included on the same integrated circuit as processor 202, or alternatively some portion or all of memory 204 may be disposed on an integrated circuit or other medium, for example a hard disk drive, that is external to the integrated circuit of processor 202. The embodiments are not limited in this context.

In various embodiments, media processing sub-system 108 may include a transceiver 206. Transceiver 206 may be any radio transmitter and/or receiver arranged to operate in accordance with a desired wireless protocols. Examples of suitable wireless protocols may include various wireless local area network (WLAN) protocols, including the IEEE 802.xx series of protocols, such as IEEE 802.11a/b/g/n, IEEE 802.16, IEEE 802.20, and so forth. Other examples of wireless protocols may include various wireless wide area network (WWAN) protocols, such as Global System for Mobile Communications (GSM) cellular radiotelephone system protocols with General Packet Radio Service (GPRS), Code Division Multiple Access (CDMA) cellular radiotelephone communication systems with 1×RTT, Enhanced Data Rates for Global Evolution (EDGE) systems, and so forth. Further examples of wireless protocols may include wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles (collectively referred to herein as "Bluetooth Specification"), and so forth. Other suitable protocols may include Ultra Wide Band (UWB), Digital Office (DO), Digital Home, Trusted Platform Module (TPM), ZigBee, and other protocols. The embodiments are not limited in this context.

In various embodiments, media processing sub-system 108 may include one or more modules. The modules may comprise, or be implemented as, one or more systems, sub-systems, processors, devices, machines, tools, components, circuits, registers, applications, programs, subroutines, or any combination thereof, as desired for a given set of design or performance constraints. The embodiments are not limited in this context.

In one embodiment, for example, media processing subsystem 108 may include a luminance scaling module (LSM) 208. LSM 208 may be used to adjust a contrast level for an input image. In one embodiment, LSM 208 may be arranged to perform sharpness enhancement on the received input image. LSM 208 may utilize one or more predefined or predetermined mathematical luminance transfer functions to change the luminance of an input image in order to achieve a perception of stronger contrast enhancement. For example, the predetermined mathematical functions may be stored in any suitable storage device, such as memory 204, a mass storage device (MSD) 210, a hardware-implemented lookup table (LUT) 216, and so forth. It may be appreciated that LSM 208 may be implemented as software executed by processor 202, dedicated hardware, or a combination of both. The embodiments are not limited in this context.

In various embodiments, media processing sub-system 108 may include a MSD 210. Examples of MSD 210 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, media processing sub-system 108 may include one or more I/O adapters 212. Examples of I/O adapters 212 may include Universal Serial Bus (USB) ports/adapters, IEEE 1394 Firewire ports/adapters, and so forth. The embodiments are not limited in this context.

In general operation, media processing sub-system 108 may receive media information from one or more media source nodes 102-1n. For example, media source node 102-1 may comprise a DVD device connected to processor 202. Alternatively, media source 102-2 may comprise memory 204 storing a digital AV file, such as a motion pictures expert group (MPEG) encoded AV file. LSM 208 may operate to receive the media information from mass storage device 216 and/or memory 204, process the media information (e.g., via processor 202), and display the media information on display 110.

As previously described, LSM 208 may utilize one or more predefined or predetermined mathematical functions to change the luminance of an input image in order to achieve a perception of stronger contrast enhancement. For example, media processing node 106 may receive an input image having a first level of contrast, and create an output image having a second level of contrast using a scaled luminance transfer function. Media processing node 106 may accomplish this using LSM 208 of media processing sub-system 108. LSM 208 may retrieve a predefined or predetermined luminance transfer function from memory. In one embodiment, for example, the luminance transfer function may be stored in LUT 216. LSM 208 may modify or scale the retrieved luminance transfer function by a scaling factor to create the scaled luminance transfer function. This may be described in more detail with reference to FIGS. 3-5.

Figure 3:
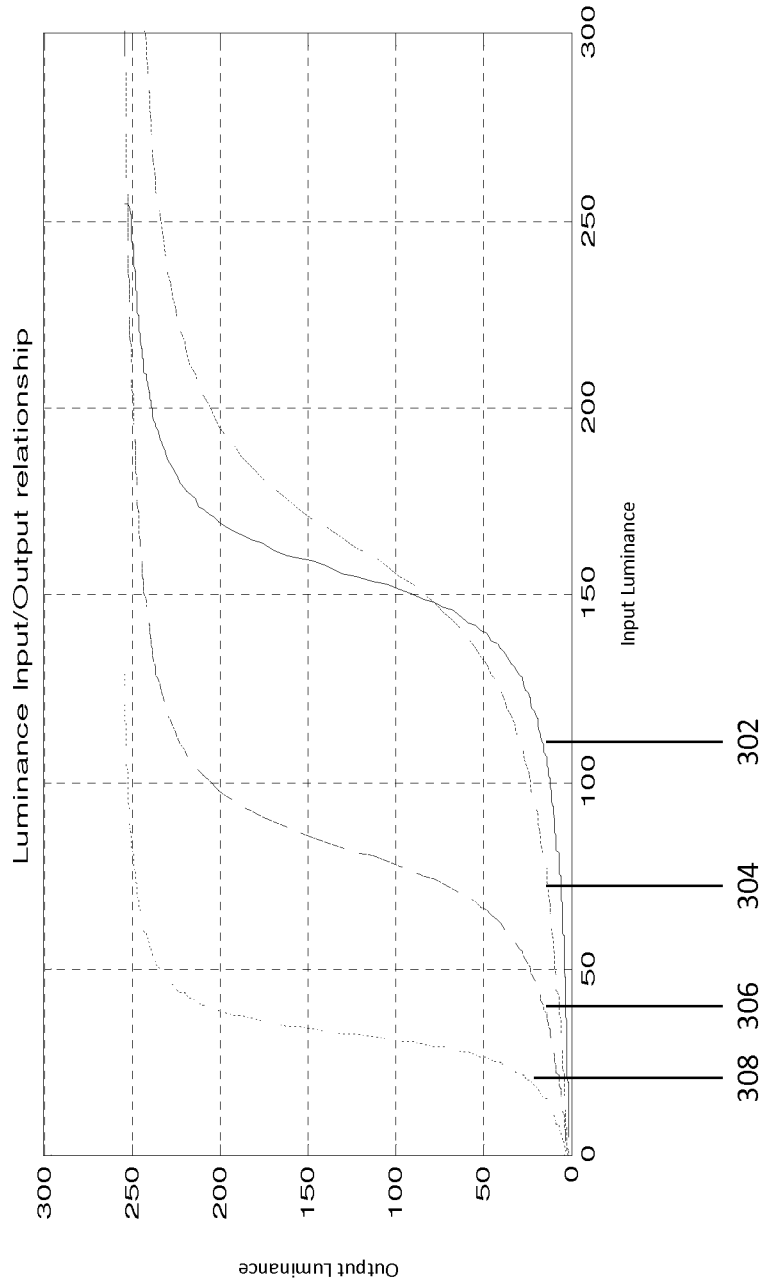
FIG. 3 illustrates one embodiment of a graph for a luminance transfer function and various scaled luminance transfer functions.

FIG. 3 illustrates one embodiment of a graph for a luminance transfer function and various scaled luminance transfer functions. FIG. 3 illustrates a graph 300. Graph 300 illustrates an example of a luminance input-output transfer function suitable for contrast adjustment and contrast enhancement of an image. More particularly, assuming 8 bit pixel values, graph 300 illustrates a luminance input $Y_{in}$ on the X axis having a range of values between 0-255 and a luminance output $Y_{out}$ on the Y axis having a range of values between 0-255. A luminance transfer function may be used to change one or more luminance values for corresponding pixels of an image in order to vary the contrast of the image. Many functions could be used for warping the luminance of an input image to an improved contrast luminance at the output image. The particular luminance transfer function selected for a given implementation should represent an average amount of acceptable contrast for the type of images received by LSM 208. For example, one type of luminance transfer function may be selected that is suitable for HDTV signals, while another type of luminance transfer function may be selected that is more suitable for NTSC signals. In one embodiment, for example, the luminance transfer function may be implemented using a trigonometric inverse tangent function, although other transfer functions may be used as well. The embodiments are not limited in this context.

As shown in graph 300, using a trigonometric inverse tangent function as the luminance transfer function transfers or changes a first set of luminance values of luminance input $Y_{in}$ (input image) to a second set of luminance values of luminance output $Y_{out}$ (output image) along transfer curve 302 of graph 300. Transfer curve 302 may create an output image with an improved picture quality relative to the input image by using the luminance transfer function to increase a first set of pixel values for a first set of pixels representing lighter portions of the input image, and decrease a second set of pixel values for a second set of pixels representing darker portions of the input image. Assuming an 8 bit value for each pixel, the lighter pixel values would be approximately 128-255, while the darker pixel values would be approximately 0-127, for example.

In one embodiment, a luminance transfer function may be selected to increase the first set of pixel values and decrease the second set of pixel values by a uniform amount. In other words, the luminance of the lighter portions and darker portions are varied by the same amount or values. This even or proportional adjustment of the luminance values may enhance the overall perceived sharpness and balance of the image. Adjusting only the lighter portions or the darker portions, or unevenly adjusting either portion, may create an unbalanced amount of contrast where the lighter portions appear too bright relative to the darker portions, and vice-versa. Selecting a trigonometric inverse tangent function as the luminance transfer function may create the appropriate proportional adjustments to both the lighter and darker portions of the image.

In various embodiments, LSM 208 may vary the contrast for an output image by applying different scale or stretch factors to the horizontal and/or vertical coordinates of transfer curve 302 to produce different levels of contrast. For example, applying a scale factor of 1/10 modifies or scales transfer curve 302 to form a scaled transfer curve 304. In another example, applying a scale factor of 1/20 modifies or scales transfer curve 302 to form a scaled transfer curve 306. In yet another example, applying a scale factor of 1/50 modifies or scales transfer curve 302 to form a scaled transfer curve 308. It may be appreciated that these particular scale factors are by way of example only, and any suitable scale factors or increments may be selected for a given implementation. The embodiments are not limited in this context.

In various embodiments, the scale factors may be manually adjusted by a user through a user interface associated with media processing node 106 or display 110. Alternatively, the scale factors may be automatically selected and applied by LSM 208. The embodiments are not limited in this context.

As shown in graph 300, applying a scale factor to transfer curve 302 scales and shifts transfer curve 302 to form scaled transfer curves 304, 306 and 308. Each scaled transfer curve 304, 306 and 308 changes the level of contrast in the output image. This may be described in more detail with reference to FIGS. 4A-C.

Figure 4A:
FIG. 4A illustrates a first image with a first level of contrast corresponding to a first scaled luminance transfer function represented by a transfer curve 304.
Figure 4B:
FIG. 4B illustrates a second image with a second level of contrast corresponding to a second scaled luminance transfer function represented by a transfer curve 306.
Figure 4C:
FIG. 4C illustrates a third image with a third level of contrast corresponding to a third scaled luminance transfer function represented by transfer curve 308.

FIGS. 4A-C each represent an image with a different level of contrast. For example, FIG. 4A presents a first image with a first level of contrast corresponding to a first scaled luminance transfer function represented by scaled transfer curve 304. In another example, FIG. 4B presents a second image with a second level of contrast corresponding to a second scaled luminance transfer function represented by scaled transfer curve 306. In yet another example, FIG. 4C presents a third image with a third level of contrast corresponding to a third scaled luminance transfer function represented by scaled transfer curve 308. When comparing the images, it may be appreciated that the first image is too dark, and the third image is too bright. Therefore the corresponding first and third scaled luminance transfer functions used to create the first and third images, respectively, may not be desirable for a given viewer. The second image, however, increases the lighter and darker portions proportionally, and therefore creates a sharper and more balanced image. Accordingly, the second scaled luminance transfer function may be selected to create the desired level of contrast for some viewers.

In various embodiments, LSM 208 may create the output image with an improved picture quality relative to the input image by using the scaled luminance transfer function to increase a first set of pixel values for a first set of pixels representing lighter portions of the input image, and decrease a second set of pixel values for a second set of pixels representing darker portions of the input image. In one embodiment, LSM 208 may increase the first set of pixel values and decrease the second set of pixel values by a uniform amount. The embodiments are not limited in this context.

In various embodiments, LSM 208 may increase the first set of pixel values relative to a maximum pixel value for the lighter portions, and decrease the second set of pixel values relative to a minimum pixel value for the darker portions. This may improve the picture quality of the output image by stretching the luminance extremes, such as the darkest dark pixels and the brightest bright pixels, into the maximum possible values for dark black and bright white. The maximum possible values may be 0 for dark black and 255 for bright white assuming an 8 bit per pixel representation. This may be a desirable feature since this technique enhances the overall perceived sharpness and perceived impression of depth in video sequences.

Figure 5A:
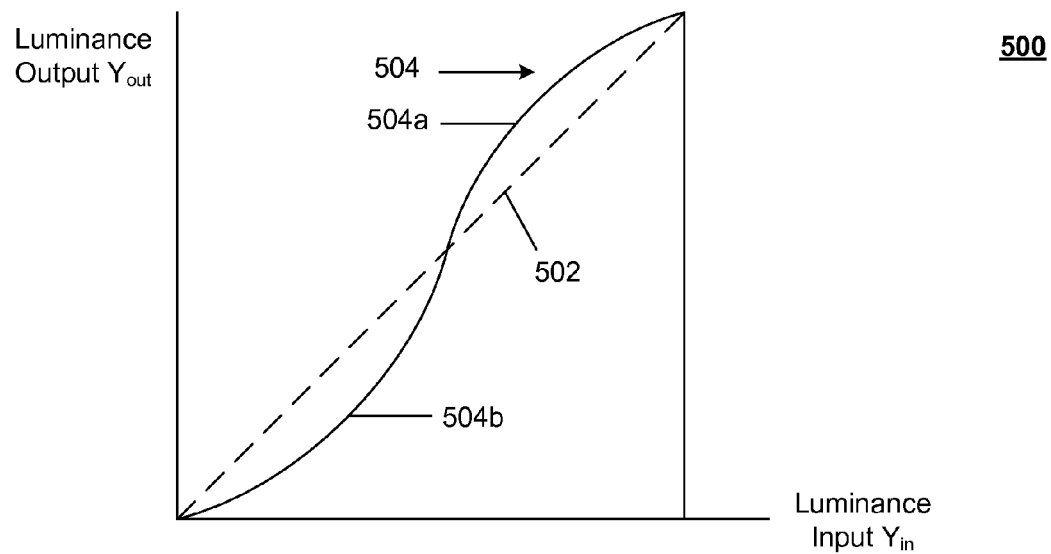
FIG. 5A illustrates one embodiment of a graph for a luminance transfer function.

FIG. 5A illustrates one embodiment of a graph for a luminance transfer function. FIG. 5A illustrates a graph 500. Graph 500 illustrates another example of a luminance input-output transfer function suitable for contrast adjustment and contrast enhancement of an image. More particularly, graph 500 illustrates a luminance input $Y_{in}$ on the X axis having a range of values between 0-255 and a luminance output $Y_{out}$ on the Y axis having a range of values between 0-255. Line 502 of graph 500 represents a 1:1 (linear) correspondence between luminance input $Y_{in}$ and luminance output $Y_{out}$. In other words, there is no change in luminance values between the input image and the output image along line 502. Transfer curve 504 may represent a luminance transfer function prior to scaling as performed by LSM 208. Transfer curve 504 may comprise transfer curve segments 504a, 504b. As shown in FIG. 5A, transfer curve segment 504a increases the first set of pixel values for the lighter portions by an amount equal to an amount that transfer curve segment 504b decreases the second set of pixel values for the darker portions. This even or proportional adjustment of the luminance values may enhance the overall perceived sharpness and balance of the image.

Figure 5B:
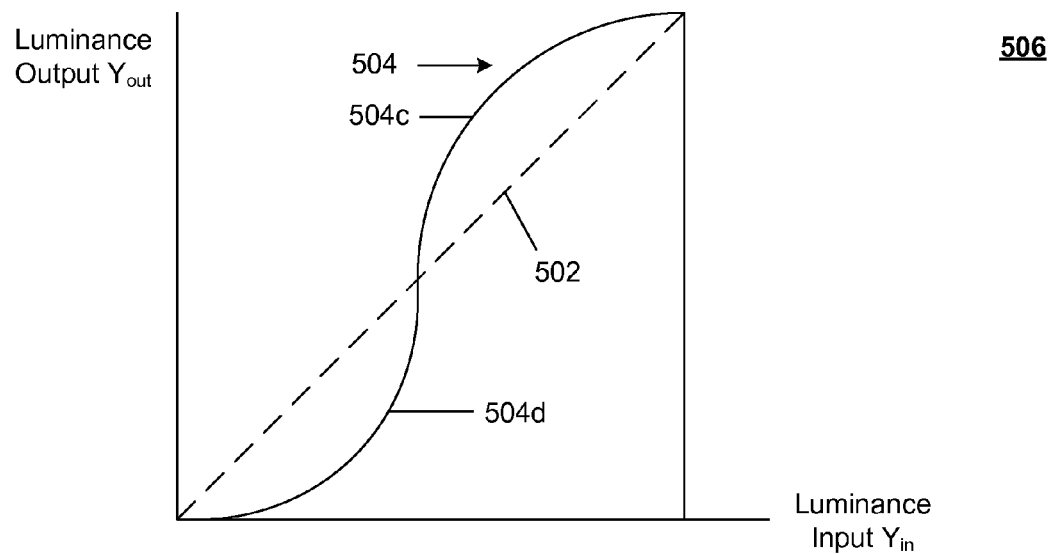
FIG. 5B illustrates one embodiment of a graph for a scaled luminance transfer function.

FIG. 5B illustrates one embodiment of a second graph for a scaled luminance transfer function. FIG. 5B illustrates a graph 506. Graph 506 is similar to graph 500 and illustrates a scaled luminance input-output transfer function suitable for contrast adjustment and contrast enhancement of an image. More particularly, graph 506 illustrates a case where the luminance transfer function represented by transfer curve 504 in graph 500 has been scaled. In graph 506, transfer curve 504 has been scaled to increase the amount of contrast for the input image. As shown in FIG. 5B, transfer curve segment 504c has been increased relative to transfer curve 504a, and transfer curve segment 504d has been decreased relative to transfer curve 504b. Furthermore, transfer curve segments 504c, 504d remain uniform relative to each other after scaling operations have occurred. In this manner, LSM 208 may perform scaling operations to vary the contrast while ensuring that a balanced and even amount of contrast is applied to both the lighter and darker portions of the input image.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
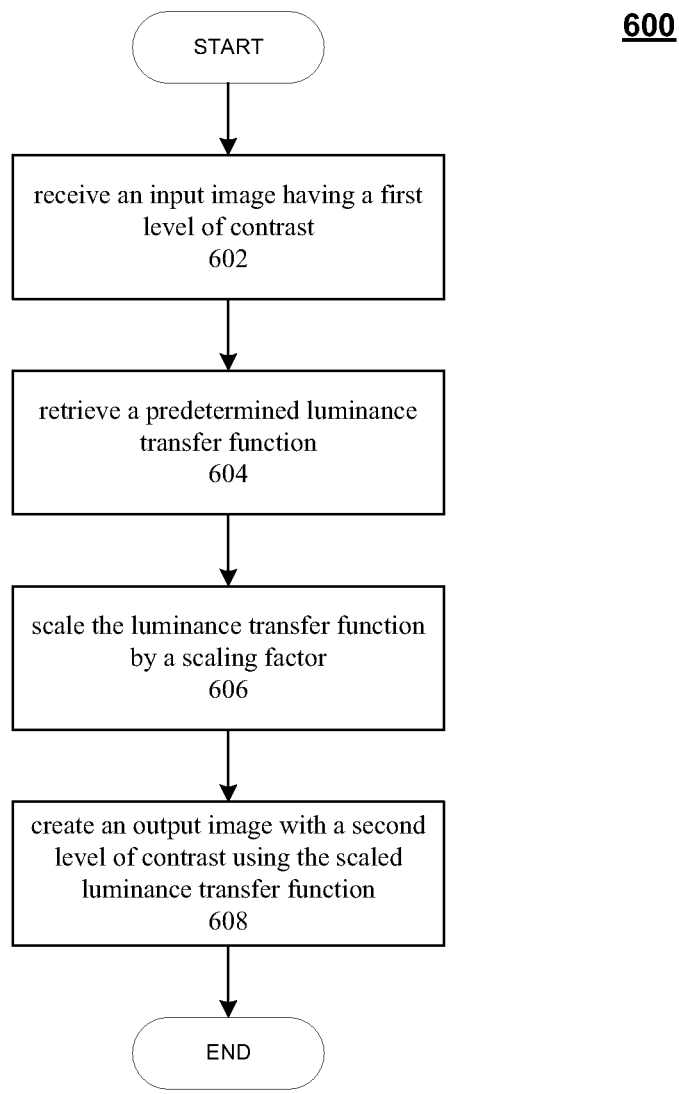
FIG. 6 illustrates one embodiment of a logic flow.

FIG. 6 illustrates one embodiment of a logic flow. FIG. 6 illustrates a logic flow 600. Logic flow 600 may be representative of the operations executed by one or more embodiments described herein, such as media processing system 100, media processing sub-system 108, and/or LSM 208. As shown in logic flow 600, an input image having a first level of contrast may be received at block 602. A predetermined luminance transfer function may be retrieved at block 604. The luminance transfer function may be scaled by a scaling factor at block 606. An output image with a second level of contrast may be created using the scaled luminance transfer function at block 608. The embodiments are not limited in this context.

In one embodiment, a first set of pixel values for a first set of pixels representing lighter portions of the input image may be increased, and a second set of pixel values for a second set of pixels representing darker portions of the input image may be decreased. In one embodiment, the first set of pixel values may be increased, and the second set of pixel values may be decreased, by a uniform amount. The embodiments are not limited in this context.

In one embodiment, increasing the first set of pixel values is performed relative to a maximum pixel value for the lighter portions, and decreasing the second set of pixel values is performed relative to a minimum pixel value for the darker portions. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
a media processing node to receive an input image having a first level of contrast, and create an output image having a second level of contrast using a scaled stored predetermined luminance transfer function, wherein said creating said output image using said scaled stored predetermined luminance transfer function excludes modifying a luminance histogram.

2. The apparatus of claim 1, said media processing node to include a luminance scaling module, said luminance scaling module to modify a luminance transfer function by a scaling factor to create said scaled luminance transfer function.

3. The apparatus of claim 2, said media processing node to include a lookup table to store said luminance transfer function.

4. The apparatus of claim 2, said luminance scaling module to use said scaled luminance transfer function to increase a first set of pixel values for a first set of pixels representing lighter portions of said input image, and decrease a second set of pixel values for a second set of pixels representing darker portions of said input image.

5. The apparatus of claim 4, said luminance scaling module to increase said first set of pixel values and decrease said second set of pixel values by a uniform amount.

6. The apparatus of claim 4, said luminance scaling module to increase said first set of pixel values relative to a maximum pixel value for said lighter portions, and decrease said second set of pixel values relative to a minimum pixel value for said darker portions.

7. A system, comprising:
a display;
a communications medium; and
a media processing node to couple to said communications medium, said media processing node to receive an input image having a first level of contrast, and create an output image having a second level of contrast using a scaled stored pre-determined luminance transfer function, wherein said creating said output image using said scaled stored pre-determined luminance transfer function excludes modifying a luminance histogram.

8. The system of claim 7, said media processing node to include a luminance scaling module, said luminance scaling module to modify a luminance transfer function by a scaling factor to create said scaled luminance transfer function.

9. The system of claim 8, said media processing node to include a lookup table to store said luminance transfer function.

10. The system of claim 8, said luminance scaling module to use said scaled luminance transfer function to increase a first set of pixel values for a first set of pixels representing lighter portions of said input image, and decrease a second set of pixel values for a second set of pixels representing darker portions of said input image.

11. The system of claim 10, said luminance scaling module to increase said first set of pixel values and decrease said second set of pixel values by a uniform amount.

12. The system of claim 10, said luminance scaling module to increase said first set of pixel values relative to a maximum pixel value for said lighter portions, and decrease said second set of pixel values relative to a minimum pixel value for said darker portions.

13. A computer-implemented method, comprising:
receiving an input image having a first level of contrast;
retrieving a stored predetermined luminance transfer function;
scaling said luminance transfer function by a scaling factor; and
creating an output image with a second level of contrast using said scaled luminance transfer function, wherein said creating said output image using said scaled stored pre-determined luminance transfer function excludes modifying a luminance histogram.

14. The method of claim 13, comprising:
increasing a first set of pixel values for a first set of pixels representing lighter portions of said input image; and
decreasing a second set of pixel values for a second set of pixels representing darker portions of said input image.

15. The method of claim 14, wherein said increasing said first set of pixel values and decreasing said second set of pixel values is performed by a uniform amount.

16. The method of claim 14, wherein said increasing said first set of pixel values is performed relative to a maximum pixel value for said lighter portions, and decreasing said second set of pixel values is performed relative to a minimum pixel value for said darker portions.

17. An article comprising a machine-readable storage medium containing instructions that if executed enable a system to receive an input image having a first level of contrast, retrieve a stored predetermined luminance transfer function, scale said luminance transfer function by a scaling factor, and create an output image with a second level of contrast using said scaled luminance transfer function, wherein said creating said output image using said scaled stored pre-determined luminance transfer function excludes modifying a luminance histogram.

18. The article of claim 17, further comprising instructions that if executed enable the system to increase a first set of pixel values for a first set of pixels representing lighter portions of said input image, and decrease a second set of pixel values for a second set of pixels representing darker portions of said input image.

19. The article of claim 18, further comprising instructions that if executed enable the system to increase said first set of pixel values and decrease said second set of pixel values by a uniform amount.

20. The article of claim 18, further comprising instructions that if executed enable the system to increase said first set of pixel values relative to a maximum pixel value for said lighter portions, and decrease said second set of pixel values relative to a minimum pixel value for said darker portions.

* * * * *